Dec. 4, 1934.                R. M. SCHULTZ                1,983,314
                              HEAT MOTOR
                          Filed June 14, 1929
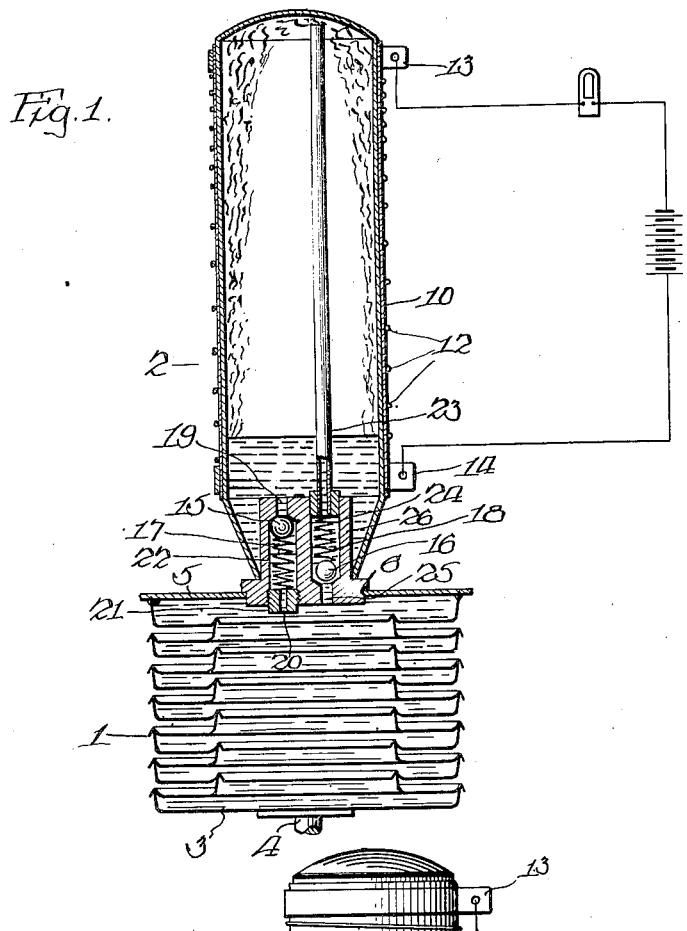
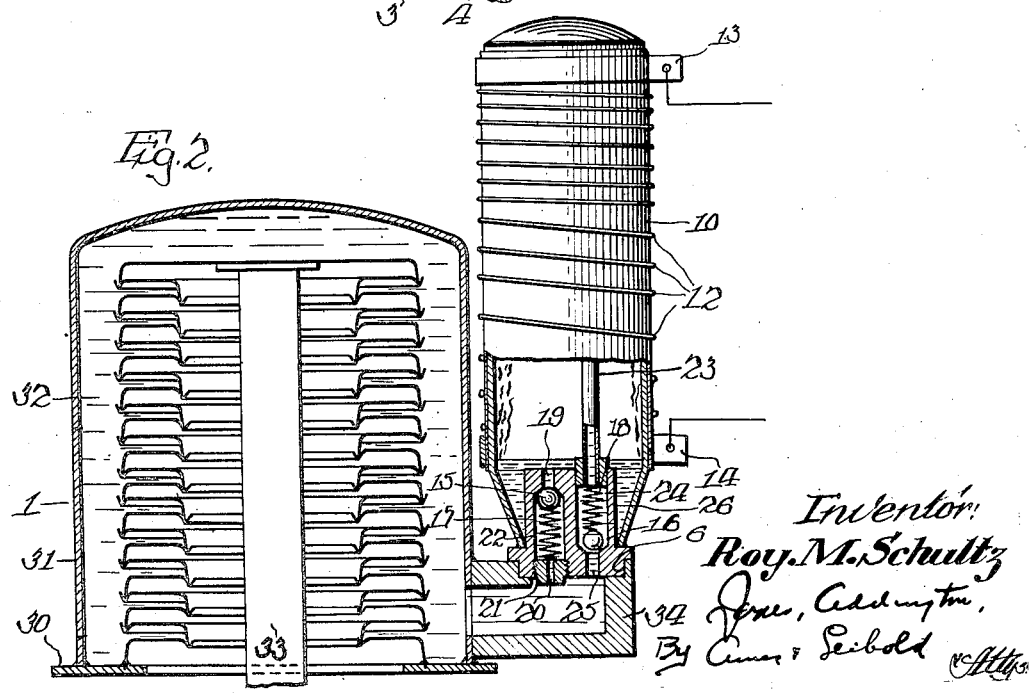
Inventor:
Roy. M. Schultz Patented Dec. 4, 1934

1,983,314

UNITED STATES PATENT OFFICE 1,983,314

HEAT MOTOR

Roy M. Schultz, Chicago, Ill., assignor to Cook Electric Company, Chicago, Ill., a corporation of Illinois Application June 14, 1929, Serial No. 370,968

11 Claims. (Cl. 60—25)

My invention relates to heat motors and thermally controlled vapor motors and more particularly to a vapor motor adapted to be influenced by the action of a volatile fluid, or like means.

Devices of this type, which are constructed in a manner to be influenced by the thermal expansion of a volatile fluid, usually consist of an expansible and contractible vessel cooperating with a suitable source of heat arranged to heat the fluid and increase the pressure within the vessel. Numerous factors obviously enter into the timing of the movement of the vessel. It has been found that the vessel contracts at a rather slow rate after the heat is discontinued and that the initial contracting movement is slow due to the time required before heat is dissipated sufficiently to effectively lower the pressure. The cooling action is usually so slow that it is difficult to control the contracting movement in proper timed relation to the movement of other devices, such as temperature controls or regulators, to which the heat motor may be adapted, usually as an actuating element.

One of the objects of the present invention resides in the provision of an improved form of heat or vapor motor having a heating tube or boiler provided with a heating zone in communication with an expansible and contractible vessel and a source of heat, which are so arranged that the contraction of the vessl is made rapid, or accelerated, by rapid cooling of the heating zone or heater.

More specifically, this result may be accomplished by arranging for a rapid return of the cool volatile fluid into the heating zone or heater. Accordingly, the heater is quickly cooled and the pressure rapidly reduced to permit rapid contraction of the vessel.

The specific mechanism provided for this purpose may take the form of a valve structure having one-way check valves whereby the pressure in the heater will force the volatile fluid into the vessel where it will remain as long as the pressures in the heater and in the vessel are balanced. When the heat is discontinued at the heater and the temperature is lowered, this pressure balance will be destroyed and the cool volatile fluid in the vessel will surge upwardly into the heater.

I have found in the case of a heat or vapor motor of a given size or capacity and embodying my invention, that the vessel contracts within twenty-five to thirty seconds as compared to the formerly required time of three minutes. The return movement or contraction of the vessel, say within one-sixth of the time of that formerly required, may vary somewhat with vessels of different sizes and capacities.

It is to be understood that the travel of the vessel on its return stroke is not necessarily limited to a contraction of the vessel, but may refer to an expansion of the vessel where reverse action in the operation of the vessel is employed.

Other objects and advantages of the invention will be apparent from the following description when taken in connection with the accompanying drawing, in which:

Figure 1 is a vertical sectional view of a heat motor embodying my invention, and Fig. 2 is a similar view of another embodiment of my invention.

In the drawing, wherein, for the purpose of illustration, there are shown several preferred embodiments of my invention, the vapor or heat motor may comprise an expansible and contractible vessel 1 having a volatile fluid therein and a tube 2 or boiler (forming a part of a heating device) in communication with the vessel and which receives a portion of the liquid. This vessel 1 is preferably shown as comprising a well-known form of bellows, which readily expands or contracts upon an increase of pressure therein. Heating tube 2 may be closed at either end and communicate at the opposite end with vessel 1 and in fact forms a part or extension of said vessel.

As to the specific form of heating device that may be used, it is obvious that an electrical resistance coil may be conveniently located at or adjacent to heating tube 2. A heating zone will be provided within heating tube 2 for heating the volatile fluid and driving it into vessel 1 by volatilization. The pressure within the tube will be gradually increased until the level of the liquid is depressed, whereupon further volatilization stops as the liquid is driven out of the heating zone. It is by this means that a predetermined expansion or movement of vessel 1 may be effectively obtained and held without danger of the pressure within building up to a point where the vessel will burst. This subject-matter has been disclosed and claimed in United States Letters Patent No. 1,874,710, granted August 30, 1932, to the assignee of the present application.

The vapor motor shown in Figure 1 includes the expansible and contractible vessel 1 having one end closed by a plate 3, to which may be attached a movable actuating rod 4. A plate 5 suitably closes off the opposite end of vessel 1, this plate being provided with an opening 6 for receiving in sealed relation the open end of tube 2.

A sheet of mica 10, or other suitable insulation, may be wrapped about heating tube 2 so as to provide electrical insulation for an electrical resistance wire or heat coil 12 wound about the tube. Terminal bands 13 and 14 are clamped at proper points along tube 2 to receive the ends of heat coil 12. While I have shown a heat coil of an electrical circuit for furnishing heat or acting as a source of heat for the vapor motor, it will be understood that any suitable heating means may be employed.

I have also found, as disclosed and claimed in United States Letters Patent No. 1,902,260, granted March 21, 1933, that by controlling the application of heat, the volatilization of the fluid and the consequent expansion or movement of vessel 1 may be accurately controlled under a wide set of conditions. That is to say, the time required to complete the full outward stroke of a predetermined movement of vessel 1 may be ascertained and accordingly controlled.

This result is accomplished by so spacing the windings of heat coil 12 as to concentrate or localize the heat, either initially or during subsequent operations of the stroke, along tube 2, and thereby effect volatilization of a portion or all the liquid in a given time. Spacing the windings of heat coil 12 more closely together at the top of tube 2 causes a relatively quick volatilization of the liquid at the upper end of the column so that rapid building up of pressure at this point takes place. Accordingly, the level of the fluid is rapidly depressed to expand or move a greater volume of the fluid into the vessel to accelerate expansion. This rapid building up of pressure is continued after once started so that the full stroke may be completed in a relatively short time.

As pointed out, it will be understood that the specific example given of the manner in which the turns of heat coil 12 are spaced, is merely illustrative, and accordingly may be varied to suit a given set of conditions in the timing of the outward stroke of vessel 1.

I find that by cooling tube 2 in a certain manner, the pressure therein may be rapidly reduced and vessel 1 may be quickly contracted. That is to say, the time required to effect the full return stroke of vessel 1 may be ascertained, and accordingly controlled, so that the vapor motor may be used in regulators requiring practically any given set of time operations.

To accomplish this feature, a valve housing 26 in the form of a nipple is inserted and hermetrically sealed in opening 6 of plate 5. Lower end of tube 2 extends downwardly and over a portion of valve housing in sealed relation. One-way check valves comprising an outlet valve 15 and an inlet valve 16 are provided in housing 26, these valves being in the form of balls normally held against their seat by springs 17 and 18. Outlet port 19 controlled by outlet valve 15 communicates with the interior of vessel 1 by a restricted opening 20 furnished by a threaded plug 21 placed in the lower end passage 22 in which check valve 15 and spring 17 are disposed. The inlet port for tube 2 is in the form of a pipe 23, terminating with an open upper end slightly under the roof or closed end of tube 2. Passage 24, in which valve 16 and spring 18 are disposed, communicates with the lower end of pipe 23 and by means of a port 25, with the interior of vessel 1.

When the circuit is closed, heat is developed at coil 12 and is conducted inwardly to volatilize the fluid in tube 2. As hereinbefore explained, a greater amount of heat is applied at the upper end of tube 2 so that the fluid in this upper end may be rapidly volatilized. The pressure of the vapor depresses the unvaporized liquid, but it will be understood that the vaporizing action continues to take place during this time. Such depression of the liquid, drives the same out of the tube 2 and into vessel 1 to expand and actuate the vessel, the level of the liquid lowering until it passes out of the heating zone. When volatilization of the liquid and expansion of the vapor ceases, a pressure balance within the tube and vessel results whereby the vessel may be held at a predetermined expansion until the circuit is open and the heating is discontinued. Outlet valve 15 prevents the fluid in vessel 1 returning by way of port 19. The inlet valve 16 is unseated as soon as the pressure balance is destroyed by the slightest reduction of pressure in tube 2 after the heat is discontinued. Volatile fluid in vessel 1 being under pressure will immediately surge upwardly through pipe 23 in a spray against the inner walls of tube 2. It will be noted that this cool volatile fluid will first contact against the hottest portion of the walls whereby continued reduction of vapor pressure is rapid and vessel 1 is allowed to quickly return to its original position. Cooling the walls of tube 2 will liquefy the vapors or gases therein and allow sufficient volatile fluid to return thereinto from out of vessel 1.

Inasmuch as I believe that I am the first to suggest cooling a heating device of a heat motor in the manner disclosed herein, I do not intend to be limited to the structure, as shown herein, to accomplish this result.

In Figure 2, the embodiment of the invention illustrates a structure wherein vessel 1 is contracted instead of expanded upon heating of the volatile liquid in tube 2. In this instance vessel 1 is hermetically sealed to a plate 30 extending outwardly from its lower edge so as to receive a housing 31 seating thereover and enclosing vessel 1. This arrangement provides a closed expansion chamber 32 between vessel 1 and housing 31 so that any increase of pressure within this chamber will compress vessel 1 to move an actuating arm 33 downwardly. Tube 2 may communicate by means of a coupling 34 with chamber 32 at one side of housing 31.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A heat motor comprising, in combination, an expansible and contractible vessel and a substantially closed tube in communication with said vessel, a volatile liquid in said vessel and said tube, means for creating a vapor pressure in said tube and consequently a pressure in said vessel comprising an electrically operated heat coil about said tube providing a heating zone for the liquid in said tube, said pressure depressing a substantial portion of the liquid from said tube into said vessel to maintain the latter expanded while said heat coil remains energized, and means for spraying the liquid depressed into said vessel back into said tube to effect rapid cooling thereof and condensing of the vapor upon initial condensation of the vapor when said heat coil is deenergized.

2. A heat motor comprising, in combination, an expansible and contractible vessel and a substantially closed tube in communication with said vessel, a volatile liquid in said vessel and said tube, means for creating a vapor pressure in said tube and consequently in said vessel comprising an electrically operated heat coil about said tube providing a heating zone for the liquid in said tube, said pressure depressing a substantial portion of the liquid from said tube into said vessel to maintain the latter expanded while said heat coil remains energized, and a jet for spraying the liquid depressed into said vessel back into said tube to effect rapid condensation of the vapor upon initial condensation of the vapor when said heat coil is deenergized.

3. A heat motor comprising, in combination, an expansible and contractible vessel and a heating chamber in communication with said vessel, a volatile liquid in said vessel and said heating chamber, means for heating said volatile liquid, the vapors that form from said heating collecting in said heating chamber and the unvolatilized liquid entering said vessel, and means for returning the unvolatilized liquid into said heating chamber in the form of a spray contacting the upper walls of said heating chamber that have been heated by said heating means and condensing the vapors.

4. In combination with a heat motor having an expansible and a contractible vessel, a volatile liquid, and a heating device for vaporizing a portion of said liquid, means for cooling said heating device at an accelerated rate when said heating device is deenergized, said means utilizing the unvaporized liquid to cool said heating device by bringing said unvaporized liquid aganst the walls of said heating device at a rate in excess of that permitted by a condensation of the vapors through cooling by radiation.

5. A heat motor comprising an expansible and contractible vessel having a volatile liquid therein, heating means for vaporizing a portion of said liquid to create a vapor pressure in and expand said vessel, the vapors collecting above the unvaporized liquid, and means for accelerating the cooling of said heating means after deenergized to affect the rapid condensation of the vapors formed including provisions for producing a rapid cooling action of said heating device by bringing said unvaporized liquid against said heating means whereby rapidly to condense said vapors and effect more rapid contraction of said vessel.

6. A heat motor comprising a closed body filled with a volatile liquid, said body having a section expansible by the pressure of the liquid, a relatively inexpansible section having heating means therefor, and means for cooling said heating means and said inexpansible section after said heating means is deenergized, comprising a jet for spraying the liquid against the walls of said inexpansible section.

7. In a heat motor, a work chamber, a heating chamber communicating with said work chamber and forming a closed system, a volatile liquid in said system, means associated with said heating chamber for heating the liquid, the vapor so formed producing a pressure lowering the level of the liquid in said heating chamber by depressing the unvaporized liquid into the said work chamber, and means for returning the liquid from said work chamber into said heating chamber, said means spraying the liquid against a relatively hot portion of said heating chamber to cool and condense the vapor.

8. In a heat motor, a work chamber and a communicating heating chamber, a volatile liquid in said chambers, means associated with said heating chamber for heating the liquid, the vapor so formed producing a pressure lowering the level of the liquid in said heating chamber by depressing the unvaporized liquid into said work chamber, and means disposed between said chambers operable upon cessation of said heating means to spray the unvaporized liquid depressed into said work chamber against the heated walls of said heating chamber to effect rapid cooling thereof to cool and condense the vapor.

9. In a heat motor, a work chamber and a communicating heating chamber, a volatile liquid in said chambers, means associated with said heating chamber for heating the liquid and vaporizing a portion thereof to create a pressure and thereby to lower the level of the liquid in said heating chamber by depressing the unvaporized liquid into said work chamber, and means disposed between said chambers operable upon cessation of said heating means to cause the unvaporized liquid depressed into said work chamber to surge upwardly and directly against a limited portion of the heated walls of said heating chamber to effect rapid cooling thereof and a rapid condensation of the vapors.

10. In a heat motor, a work chamber and a communicating heating chamber, a volatile liquid in said chambers, means associated with said heating chamber for heating the liquid and for vaporizing a portion thereof to create a pressure and to lower the level of the liquid in said heating chamber by depressing the unvaporized liquid into said work chamber, and means operable upon cessation if said heating means to spray the unvaporized liquid depressed into said work chamber against substantially the upper portion of said heating chamber to effect rapid cooling thereof and a rapid condensation of the vapors.

11. A heat motor comprising an expansible and contractible vessel having a volatile liquid therein, a heating device for volatilizing said liquid and effecting expansion of said vessel, and cooling means for said heating device having provisions for effecting more rapid cooling of a limited area of said heating device whereby to accelerate the cooling of said heating device and effect more rapid contraction of said vessel.

ROY M. SCHULTZ.